W. R. DUTEMPLE.
FASTENER.
APPLICATION FILED SEPT. 8, 1910.

997,660.

Patented July 11, 1911.

WITNESSES.
Albert G. Puczenkowski
George H. McLaughlin.

INVENTOR.
William R. Dutemple
By Horatio E. Bellows
ATTORNEY.

UNITED STATES PATENT OFFICE.

WILLIAM R. DUTEMPLE, OF CRANSTON, RHODE ISLAND.

FASTENER.

997,660.    Specification of Letters Patent.    Patented July 11, 1911.

Application filed September 8, 1910. Serial No. 580,991.

*To all whom it may concern:*

Be it known that I, WILLIAM R. DUTEMPLE, a citizen of the United States, residing at Cranston, in the county of Providence and State of Rhode Island, have invented certain new and useful Improvements in Fasteners, of which the following is a specification.

My invention relates to fasteners or pins adapted to attach or secure garments, filaments, or other articles, and has for its essential objects convenience of manipulation, adaptability for diverse uses, capacity for ornamentation, cheapness, strength, and rigidity of the pin members relatively to the sleeve.

In my prior U. S. Patent No. 863,161 I have shown a fastener wherein a transversely slotted sleeve receives solder to prevent the relative rotation of the pin members, which not only tends to weaken the parts but mars the front face of the fastener when used as an independent ornament.

To the end of overcoming the last mentioned disadvantages, and of attaining the advantages first enumerated, my invention consists in such novel construction, arrangement, and combination of parts as are covered by the claim hereto appended.

Figure 1:
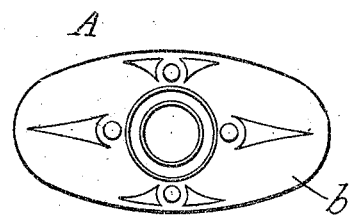
Figure 2:
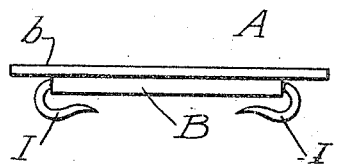
Figure 3:
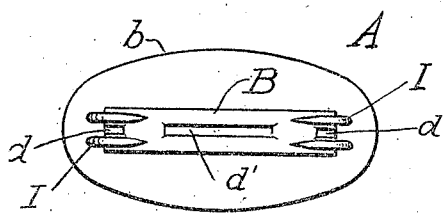
Figure 4:
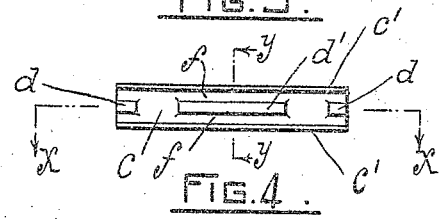
Figure 5:
Figure 6:
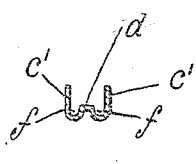
Figure 7:
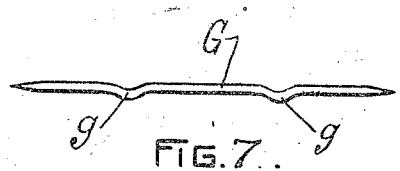
Figure 8:
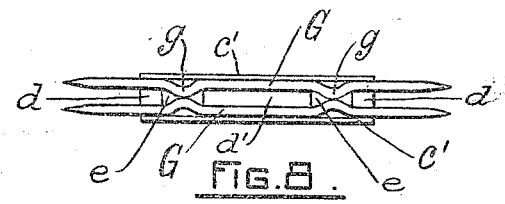
Figure 9:
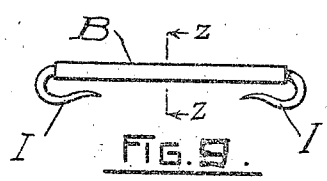
Figure 10:
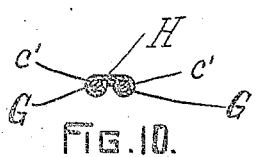

In the accompanying drawings, which form a part of this specification, and in which like reference characters indicate like parts throughout the views, Figures 1, 2, and 3 are front, side, and bottom plan views respectively of a pin provided with my novel fastener, Fig. 4, a plan view of the sleeve, Figs. 5 and 6, sections respectively of the same on lines $x$-$x$ and $y$-$y$ of Fig. 4, Fig. 7, a detail view of an unbent pin member, Fig. 8, a plan view of the unfolded bent blank with unbent pin members assembled therein, Fig. 9, a side elevation of the fastener, Fig. 10, a section of the same on line $z$ $z$ of Fig. 9.

In the drawings A designates a brooch or analogous article equipped with my novel fastener B, which is attached in the present instance by solder to the ornamental plate or body $b$. The fastener comprises a sleeve formed from an oblong rectangular blank of sheet metal, which by suitable tools is bent up into the form shown in Figs. 5 to 7 inclusive, consisting of a base $c$ and side walls $c'$. The base is provided with a plurality of longitudinally disposed elevations in alinement with each other along the inner face, in this instance two short end elevations $d$, $d$, and a long intermediate elevation $d'$. The interspacing of these elevations produces transverse relative depressions or cavities $e$, while the spaces between the elevations and the walls $c'$ form longitudinal depressions or channels $f$, $f$.

A plurality of double pointed pins G, in this instance two, have interspaced lateral bends $g$ intermediate their ends, and are placed in the channels $f$ with the bends $g$ registering in the transverse channels or cavities $e$. The walls $c'$ are then depressed tightly over the pins and into contact with the elevations $d$, $d'$. The contiguous edges of walls $c'$ form a scarcely perceptible longitudinal joint H in the upper face of the sleeve C, as shown in Fig. 10. This face is adapted to any ornamental impression by tools when it is desired to use the fastener B independently. The sharpened free ends of the pins G are then bent downwardly and inwardly toward each other to form attaching hooks or prongs I. It will be observed that by virtue of the lateral extensions $g$, and their location in the spaces intermediate the shoulders or elevations $d$, $d'$, and in contact with the base $c$ and top $c'$, $c'$, each pin member is rigidly held against both longitudinal movement, and rotary or axial movement, when the prongs are being applied. It will be understood that the fastener B may when desired have soldered or otherwise fixed to its face an ornamental body $b$ as shown in Figs. 1 to 3 inclusive.

What I claim is:—

In a fastening device, the combination of a flattened tubular body provided with longitudinally disposed internal elevations upon its bottom in contact with its top forming longitudinal channels, said elevations being interspaced from each other to form transverse channels, pins extending through the longitudinal channels and provided with laterally bent portions registering in the transverse channels and in contact with the top and bottom of the body.

In testimony whereof I have affixed my signature in presence of two witnesses.

WILLIAM R. DUTEMPLE.

Witnesses:
 HORATIO E. BELLOWS,
 WILLIAM E. TEFFT.